US009529172B2

(12) United States Patent
Baker et al.

(10) Patent No.: US 9,529,172 B2
(45) Date of Patent: Dec. 27, 2016

(54) BREAKOUT CABLE

(71) Applicant: Lenovo Enterprise Solutions (Singapore) Pte. Ltd., Singapore (SG)

(72) Inventors: Anthony E. Baker, Stittsville (CA); Stephen J. Flint, Ottawa (CA); Christian Savard, Gatineau (CA)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 190 days.

(21) Appl. No.: 14/275,831

(22) Filed: May 12, 2014

(65) Prior Publication Data

US 2015/0323742 A1    Nov. 12, 2015

(51) Int. Cl.
  *G02B 6/44* (2006.01)
  *G02B 6/28* (2006.01)
  *H04J 14/02* (2006.01)
  *G02B 6/42* (2006.01)

(52) U.S. Cl.
  CPC ........... *G02B 6/4471* (2013.01); *G02B 6/28* (2013.01); *G02B 6/44* (2013.01); *H04J 14/02* (2013.01); *G02B 6/4284* (2013.01); *G02B 6/4472* (2013.01)

(58) Field of Classification Search
  CPC .......... G02B 6/28; G02B 6/4439; G02B 6/44; G02B 6/4471; H04J 14/02
  See application file for complete search history.

(56) References Cited

U.S. PATENT DOCUMENTS

| 7,409,127 B1* | 8/2008 | Hurley | G02B 6/3817 385/101 |
|---|---|---|---|
| 7,731,432 B2 | 6/2010 | Theodoras, II et al. | |
| 7,934,959 B2 | 5/2011 | Rephaeli et al. | |
| 9,182,564 B2* | 11/2015 | Strasser | G02B 6/4471 |
| 2008/0267192 A1* | 10/2008 | Blinick | H04L 49/555 370/395.7 |
| 2009/0180737 A1 | 7/2009 | Burnham et al. | |
| 2010/0092136 A1 | 4/2010 | Nhep et al. | |

(Continued)

OTHER PUBLICATIONS

Cisco, "100GBase QSFP-100G Modules", http://www.cisco.com/c/en/us/products/collateral/interfaces-modules/transceiver-modules/datasheet-c78-736282.pdf, pp. 1-6, Apr. 2016.*

(Continued)

*Primary Examiner* — Daniel Petkovsek
(74) *Attorney, Agent, or Firm* — Douglas Robinson; Andrew M. Calderon; Roberts Mlotkowski Safran, Cole & Calderon, P.C.

(57) ABSTRACT

A breakout cable includes a data-lane module comprising a plurality of data lanes configured to send and receive a plurality of data signals, a plurality of breakout modules, and a plurality cables. Each breakout module is associated with a data lane and each cable interfaces with the data-lane module and a corresponding data lane to send and receive the plurality of signals between the data-lane module and a corresponding breakout module at a nominal 25 Gbps or a nominal 100 Gbps. In various embodiments, the data-lane module connects to a host and each of the plurality of modules connects to one or more system(s) to enable host-to-system(s) communications and system(s)-to-host communications at a nominal 100 Gbps or a nominal 400 Gbps.

8 Claims, 2 Drawing Sheets

(56) References Cited

U.S. PATENT DOCUMENTS

| | | | | |
|---|---|---|---|---|
| 2011/0317968 A1* | 12/2011 | Cline | ............ | G02B 6/4471 385/111 |
| 2012/0027355 A1* | 2/2012 | LeBlanc | ............ | G02B 6/4471 385/54 |
| 2012/0071011 A1 | 3/2012 | Kagan et al. | | |
| 2013/0115803 A1 | 5/2013 | Tang et al. | | |
| 2013/0209051 A1* | 8/2013 | Wu | ............ | G02B 6/4472 385/135 |
| 2013/0272348 A1 | 10/2013 | Lai et al. | | |
| 2014/0369347 A1* | 12/2014 | Orsley | ............ | H04L 49/25 370/358 |
| 2015/0078720 A1* | 3/2015 | Sedor | ............ | G02B 6/4472 385/137 |

OTHER PUBLICATIONS

Elpeus QSFP+ to 4 SFP+ Breakout Cable http://www.colfaxdirect.com/store/pc/viewPrd.asp?idproduct=1319 Jul. 2, 2013.

Cisco QSFP+ to Four SFP+ Copper Breakout Cables http://www.cisco.com/en/US/prod/collateral/modules/ps5455/data_sheet_c78-660083_ps11541_Products_Data_Sheet.html Jul. 2, 2013.

Interface Specifications for QSFP+ DAC Breakout Cables for the QFX Series http://www.juniper.net/techpubs/en_US/release-independent/junos/topics/reference/general/cable-qfx-qsfp-plus-breakout.html Jul. 2, 2013.

Brocade 40 GBPS QSFP+ to 4 SFP+ Copper Breakout Cables http://www.brocade.com/downloads/documents/data_sheets/product_data_sheets/40gbps-qsfp-sfp-copper.pdf 2012.

QSFP+ to 4 SFP+ Copper Breakout Cable 1M, Passive | QSFP-4SFP10G-CU1M http://www.sfpcables.com/qsfp-cable-cab-gsfp-4sfp-p1m-30 Jul. 2, 2013.

QSFP+ to 4 SFP+ Copper Breakout Cable http://estore.circuitassembly.com/categories/cables/sfp-qsfp/qsfp-to-4-sfp-copper-breakout-cable/ Jul. 2, 2013.

CFP4/QSFP28 Copper Cable for 100 Gbps Interface, Yamaichi Electronics 2014.

* cited by examiner

BREAKOUT CABLE

FIELD OF THE INVENTION

Embodiments of present invention generally relate to the field of electronics and, more specifically, relate to a nominal 100 Gbps or a nominal 400 Gbps breakout cable.

DESCRIPTION OF THE RELATED ART

QSFP+ to 4 SFP+ Active Optical Splitter Cables provide IT professionals with a fiber optic interconnect solution for connecting 4 lanes of 10-Gigabit Ethernet transmitted over a QSFP+ connector to 4 10-Gigabit Ethernet SFP+ enabled host adapters, switches and servers. For typical applications, users can install a breakout cable (a.k.a. "splitter cable," "octopus," or "fan-out" cable) between an available QSFP/QSFP+ port on a 4×10 Gigabits rated switch and feed up to four upstream or downstream 10GbE-SFP+ enabled switches.

SUMMARY

In an embodiment of the present invention, a breakout cable includes a data-lane module comprising a plurality of data lanes configured to send and receive a plurality of data signals, a plurality of modules, each module associated with a data lane, and a plurality cables, each cable interfacing with the data-lane module and a corresponding data lane to send and receive the plurality of signals between the data-lane module and a corresponding module at a nominal 25 Gbps. In various embodiments, the data-lane module connects to a host and each of the plurality of modules connects up to four systems to enable host-to-system(s) communications and system(s)-to-host communications at a nominal 100 Gbps.

In another embodiment of the present invention, a breakout cable includes a data-lane module comprising a plurality of data lanes configured to send and receive a plurality of data signals, a plurality of modules, each module associated with a data lane, and a plurality cables, each cable interfacing with the data-lane module and a corresponding data lane to send and receive the plurality of signals between the data-lane module and a corresponding module at a nominal 100 Gbps. In various embodiments, the data-lane module connects to a host and each of the plurality of modules connects up to four systems to enable host-to-system(s) communications and system(s)-to-host communications at a nominal 400 Gbps.

In another embodiment, a network comprises the breakout cable, a host networked data handling device connected to the data-lane module, and a system networked data handling device(s) connected to each of the plurality of modules to enable host-to-system(s) communications and system(s)-to-host communications.

These and other embodiments, features, aspects, and advantages will become better understood with reference to the following description, appended claims, and accompanying drawings.

DETAILED DESCRIPTION

Figure 1:
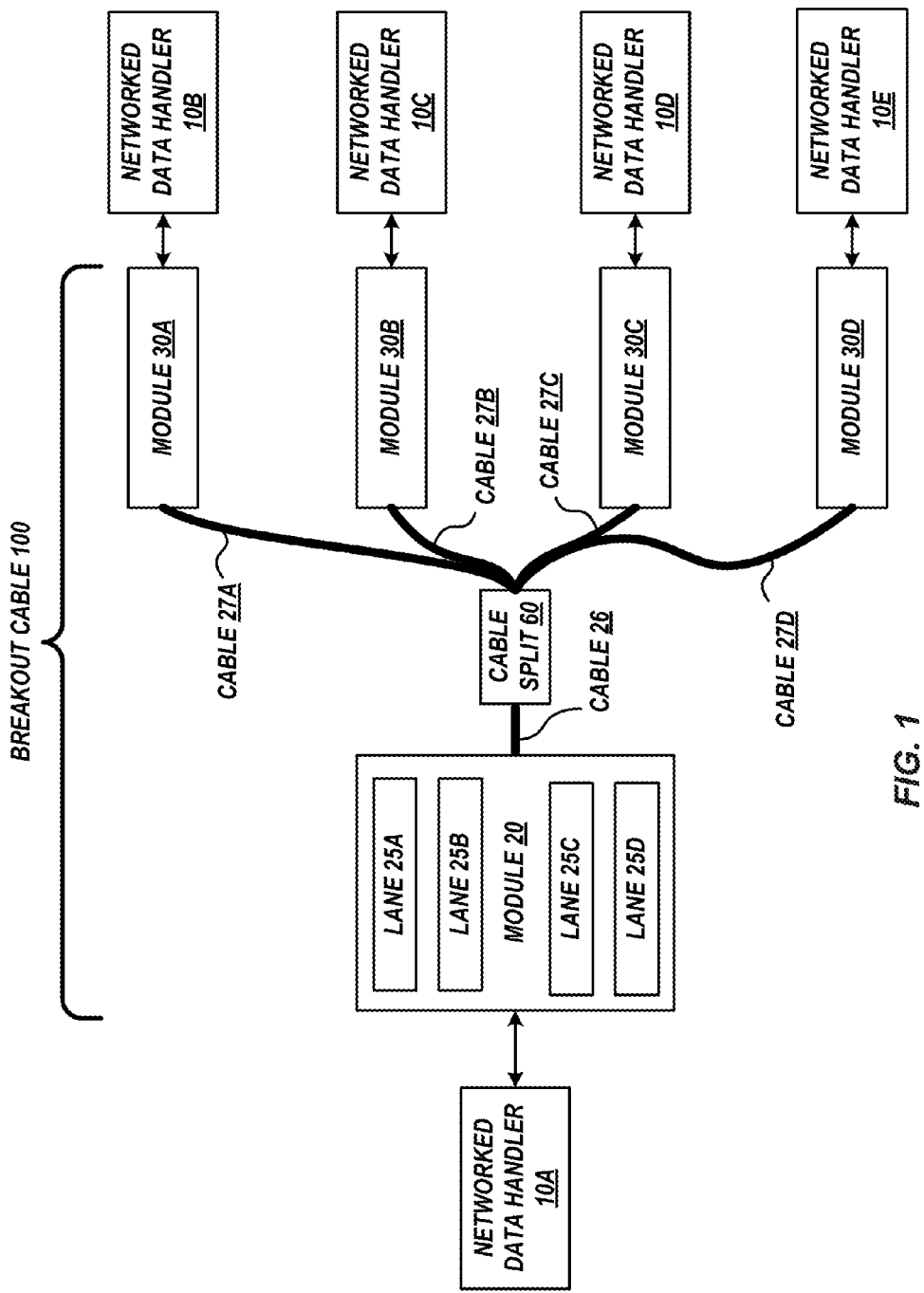
FIG. 1 illustrates an exemplary network environment comprising a plurality of networked data handling devices interconnected with a breakout cable, according to various embodiments of the present invention.

FIG. 1 illustrates an exemplary network environment 5 comprising a plurality of networked data handling devices 10A, 10B, 10C, 10D, and 10E interconnected with a breakout cable 100, according to various embodiments of the present invention.

Within the network environment 5, data communications are received and sent between data-lane module 20 and a plurality of breakout modules 30A, 30B, 30C, and 30D. Data-lane module 20 may be, for example, a small form factor pluggable (QSFP) module, and enhanced QSFP (QSFP+) module, a CFP2 module, a CFP4 module, etc. (CFP2 and CFP4 is defined by the CFP Multi-Source Agreement). Data-lane module 20 includes a plurality of data lanes 25A, 25B, 25C, and 25D. Breakout modules 30A, 30B, 30C, and 30D may be, for example, small form factor pluggable (SFP+) modules.

Networked data handling device 10A exchanges data communications with data-lane module 20 at a nominal 100 gigabits (hereinafter "100 Gbps") or a nominal 400 gigabits (hereinafter "400 Gbps"). Networked data handling device 10A exchanges data communications with breakout module 30A via lane 25A, with breakout module 30B via lane 25B, with breakout module 30C via lane 25C, and with breakout module 30D via lane 25D. If networked data handling device 10A exchanges data communications with data-lane module 20 at 100 Gbps and if data-lane module 20 includes four lanes, as shown in FIG. 1, data communications are exchanged at 25 Gbps between data-lane module 20 and respective breakout modules 30A, 30B, 30C, 30D. Likewise, if networked data handling device 10A exchanges data communications with data-lane module 20 at 400 Gbps and if data-lane module 20 includes four lanes, as shown in FIG. 1, data communications are exchanged at 100 Gbps between data-lane module 20 and respective breakout modules 30A, 30B, 30C, 30D. Such communications may be referred to as host-to-system(s) communications. System(s)-to-host communications may be data communications destined for networked data handling device 10A. Networked data handling device 10A may receiver four 25 Gbps/4 100 Gbps data communications (e.g., 100 Ggbs data communications, 400 Gbps data communications, etc.) from the networked data handling devices 10B, 10C, 10D, and 10E.

In some embodiments, as shown in FIG. 1, data-lane module 20 may include four data lanes 25A, 25B, 25C, and 25D (e.g. embodiments where data-lane module 20 is a QSFP module, QSFP+ module, a CFP4 module, etc.).

In certain embodiments, cables 27A, 27B, 27C, 27D interface with the data-lane module 20 and the plurality of breakout modules 30A, 30B, 30C, and 30D to enable host-to-system(s) communications and system(s)-to-host communications. The cables 27A, 27B, 27C, 27D may operate as data channels between data-lane module 20 and the plurality of breakout modules 30A, 30B, 30C, and 30D and are associated with lane 25A, 25B, 25C, and 25D, respectively. In other embodiments, as shown in FIG. 1, cables 27A, 27B, 27C, 27D interface with breakout modules 30A, 30B, 30C, and 30D and cable split 60 that, in turn, interfaces with the data-lane module 20 to enable host-to-system(s) communications and system(s)-to-host communications. In such embodiment, cable 26 includes data channels, each associated with lane 25A, 25B, 25C, and 25D, that are divided by cable split 60 and connected to respective breakout modules 30A, 30B, 30C, and 30D via cables 27A, 27B, 27C, 27D.

Networked data handling devices 10A-10E may be, for example an electronic system that includes a host processor complex connected to a memory by a system bus. The host processor complex may include at least one general-purpose programmable processor unit (CPU) that may execute program instructions, data, etc. stored in the memory. The memory may be for example a random access memory for storing data, program instructions, etc. Memory may include an operating system and applications. Operating system may provide functions such as device drivers or interfaces, management of memory pages, management of multiple tasks, etc., as is known in the art. Applications may be programs, procedures, algorithms, routines, instructions, software, etc. that directs what tasks the electronic system should accomplish and instructs how electronic system should accomplish those tasks. Applications may for example include a server software application whereby a network interface may interact with the server software application to enable electronic system to be a network server. Applications may alternatively, for example, include a network switching application to enable electronic system to be a network switch. The system bus may support the transfer of data, commands, and other information between the host processor system and other internal, peripheral, or networked devices attached to it.

The adapter may contain electronic components and logic in a network interface (e.g. network adapter, etc.) to adapt or convert data of one protocol on one bus to another protocol on another bus. Therefore, the network interface may connect a wide variety of devices to the electronic system and to each other such as, but not limited to, tape drives, optical drives, printers, disk controllers, other bus adapters, PCI adapters, network switches, workstations, etc. using one or more network protocols, such as 100 Gbps data communications.

Networked data handling devices 10A-10E may be a server, computer, etc. or a simpler device such as a network switch, network terminal, a thin client, a terminal-like device, a voice response unit, mobile device, a mobile client device such as laptops, sub-notebooks, etc. that includes hardware and/or software device drivers, interfaces, registers, buffers, or the like to allow for effective communication between devices within the electronic system and between other electronic systems within the network. In other embodiments, networked data handling devices 10A-10E may be data handling components within a server, computer, etc. or a simpler device such as a network switch, network terminal, a thin client, a terminal-like device, a voice response unit, mobile device, a mobile client device such as laptops, sub-notebooks, etc.

Figure 2:
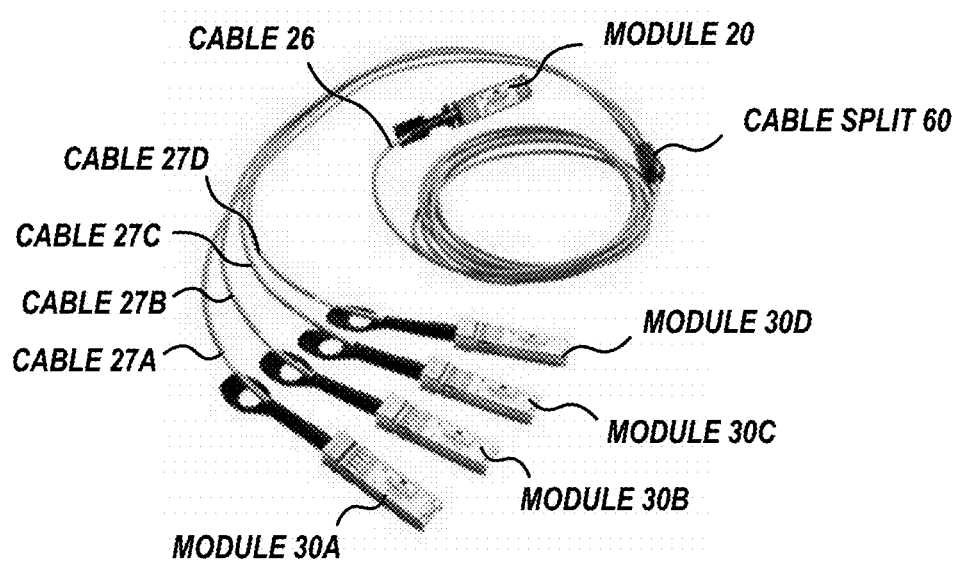
FIG. 2 illustrates an exemplary breakout cable, according to various embodiments of the present invention.

FIG. 2 illustrates an exemplary breakout cable 100, according to various embodiments of the present invention. The breakout cable 100 includes a data-lane module 20 that may connect to a networked data handling device 10A that may send and receive a plurality of data signals to/from a plurality of breakout modules 30A, 30B, 30C, and 30D that may connect to networked data handling devices 10B, 10C, 10D, and 10E, respectively. The breakout cable 100 enables host-to-system(s) communications and system(s)-to-host communications between networked data handling devices 10A, 10B, 10C, 10D, and 10E. The breakout cable 100 further includes cables 27A, 27B, 27C, and 27D that, in certain embodiments, may operate as data channels between data-lane module 20 and the plurality of breakout modules 30A, 30B, 30C, and 30D. Each cable 27A, 27B, 27C, and 27D is associated or connected to a lane 25A, 25B, 25C, and 25D, respectively. In other embodiments, as shown in FIG. 2, cables 27A, 27B, 27C, 27D interface with respective breakout modules 30A, 30B, 30C, and 30D and cable split 60 that interfaces with data-lane module 20. In such embodiment, cable 26 includes a plurality of data channels, each channel being associated with a respective lane 25A, 25B, 25C, and 25D. The cable 26 data channels are divided by cable split 60 and connected to respective breakout modules 30A, 30B, 30C, and 30D via cables 27A, 27B, 27C, 27D.

In various embodiments, cables 27A, 27B, 27C, 27D, and/or cable 26 may be copper-based active or passive cables or optical-based cables. Various cable lengths may be supported. For example, a passive direct attach cable (i.e. copper) may be 0.5 meters to 7 meters, though lesser lengths than 0.5 meters and greater lengths than 7 meters are herein contemplated. In another example, an active optical cable may be 5 meters to 30 meters, though lesser lengths than 5 meters and greater lengths that 30 meters are herein contemplated.

Breakout cable 100 enables host-to-system(s) communications and system(s)-to-host communications at 100 Gbps or 400 Gbps. For example, breakout cable 100 enables host-to-system(s) communications and system(s)-to-host communications at 100 Gbps by networked data handling device 10A exchanging data communications with data handling device 10B (via lane 25A, a first data channel within cable 60, cable 27A, and breakout module 30A) at 25 Gbps, with data handling device 10C (via lane 25B, a second data channel within cable 60, cable 27B, and breakout module 30B) at 25 Gbps, with data handling device 10D (via lane 25C, a third data channel within cable 60, cable 27C, and breakout module 30C) at 25 Gbps, and with data handling device 10E (via lane 25D, a fourth data channel within cable 60, cable 27D, and breakout module 30D) at 25 Gbps. Similarly, breakout cable 100 enables host-to-system(s) communications and system(s)-to-host communications at 400 Gbps by networked data handling device 10A exchanging data communications with data handling device 10B (via lane 25A, a first data channel within cable 60, cable 27A, and breakout module 30A) at 100 Gbps, with data handling device 10C (via lane 25B, a second data channel within cable 60, cable 27B, and breakout module 30B) at 100 Gbps, with data handling device 10D (via lane 25C, a third data channel within cable 60, cable 27C, and breakout module 30C) at 100 Gbps, and with data handling device 10E (via lane 25D, a fourth data channel within cable 60, cable 27D, and breakout module 30D) at 100 Gbps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:
1. A breakout cable comprising:
 a data-lane module comprising a plurality of data lanes configured to send and receive a plurality of data signals;

a plurality of breakout modules, each breakout module associated with a corresponding data lane;

a plurality of active optical cables, each active optical cable interfacing with the data-lane module, a corresponding one of the plurality of breakout modules, and a corresponding data lane to allow the plurality of signals to be sent and/or received between the data-lane module and the corresponding one of the breakout modules at a nominal 25 Gbps, and a cable split that connects the plurality of active optical cables with a channeled-cable connected to the data-lane module, wherein the channeled-cable comprises a plurality of data channels, each data channel interfacing with a corresponding data lane of the data-lane module.

2. The breakout cable of claim 1, wherein the data-lane module is a C form-factor pluggable (CFP2) module and wherein each of the plurality of breakout modules are enhanced small form-factor (SFP+) modules.

3. The breakout cable of claim 1, wherein the data-lane module is a CFP4 module and wherein each of the plurality of breakout modules are SFP+ modules.

4. The breakout cable of claim 1, wherein the data-lane module is a quad small form factor pluggable (QSFP) module and wherein each of the plurality of breakout modules are SFP+ modules.

5. The breakout cable of claim 1, wherein the data-lane module is an enhanced quad small form factor pluggable (QSFP+) module and wherein each of the plurality of breakout modules are SFP+ modules.

6. The breakout cable of claim 1, wherein the data-lane module connects to a host and each of the plurality of breakout modules connects to one or more systems to enable host-to-system(s) communications and system(s)-to-host communications at a nominal 100 Gbps.

7. The breakout cable of claim 1, wherein:
the data-lane module is comprised of four data lanes;
the data-lane module connects to a host; and
each of the plurality of breakout modules connects to one or more systems to enable host-to-system(s) communications and system(s)-to-host communications at a nominal 100 Gbps.

8. The breakout cable of claim 7, wherein:
the channeled-cable is comprised of four data channels respectively interfacing with a corresponding one of the four data lanes of the data-lane module; and
the plurality of active optical cables is comprised of four active optical cables respectively interfacing with a corresponding one of the four data channels of the channeled-cable.

* * * * *